US007347378B2

(12) United States Patent
Fröhlich et al.

(10) Patent No.: US 7,347,378 B2
(45) Date of Patent: Mar. 25, 2008

(54) METHOD, DEVICE SYSTEMS AND COMPUTER PROGRAMS FOR PRODUCING AND TRACING PRINTED DOCUMENTS WITH A DETERMINATE IDENTIFIER

(75) Inventors: Georg Fröhlich, Ottobrunn (DE); Wilfried Diesler, Gauting (DE); Ralf Ubert, Erding (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 10/507,406

(22) PCT Filed: Mar. 13, 2003

(86) PCT No.: PCT/EP03/02642

§ 371 (c)(1),
(2), (4) Date: Apr. 8, 2005

(87) PCT Pub. No.: WO03/077196

PCT Pub. Date: Sep. 18, 2003

(65) Prior Publication Data

US 2005/0178843 A1 Aug. 18, 2005

(30) Foreign Application Priority Data

Mar. 13, 2002 (DE) ............... 102 11 080

(51) Int. Cl.
*G06K 19/00* (2006.01)
*G06K 19/06* (2006.01)
*B41J 3/00* (2006.01)

(52) U.S. Cl. ............ 235/487; 235/493; 235/492; 347/2

(58) Field of Classification Search ........ 235/492, 235/495, 494, 493, 380, 375, 381, 382, 487, 235/462.01; 705/74, 14, 64, 401, 26, 10, 705/1, 45; 380/278, 243, 255; 340/5.86, 340/540, 541, 572.1; 382/100, 72; 426/231
See application file for complete search history.

(56) References Cited

U.S. PATENT DOCUMENTS 3,702,989 A * 11/1972 Provenzano et al. .......... 714/45

(Continued)

FOREIGN PATENT DOCUMENTS

DE  197 20 747  11/1997

(Continued)

OTHER PUBLICATIONS

Océ PRISMApro Server System, Mergen et al May 1999.

(Continued)

*Primary Examiner*—Thien M. Le
*Assistant Examiner*—Thien T Mai
(74) *Attorney, Agent, or Firm*—Schiff Hardin LLP

(57) ABSTRACT

In a method and system for production of a printed document with a unique identifier, the data medium for the unique identifier is applied on a recording medium, the data medium being capable of being electronically written without contact so that data are written without contact onto the data medium in the course of a document production event. Data of at least one of a user program, of the printed document, and of the data medium are linked in a file.

28 Claims, 10 Drawing Sheets

U.S. PATENT DOCUMENTS

| | | | |
|---|---|---|---|
| 5,712,473 A * | 1/1998 | Nagashio | 235/487 |
| 5,831,531 A | 11/1998 | Tuttle | |
| 5,962,834 A * | 10/1999 | Markman | 235/385 |
| 6,027,027 A | 2/2000 | Smithgall | |
| 6,068,192 A * | 5/2000 | McCabe et al. | 235/487 |
| 6,137,967 A * | 10/2000 | Laussermair et al. | 399/16 |
| 6,222,452 B1 * | 4/2001 | Ahlstrom et al. | 340/572.1 |
| 6,269,169 B1 * | 7/2001 | Funk et al. | 382/100 |
| 6,343,241 B1 * | 1/2002 | Kohut et al. | 700/232 |
| 6,483,426 B1 * | 11/2002 | Pagnol et al. | 340/10.1 |
| 6,542,622 B1 * | 4/2003 | Nelson et al. | 382/112 |
| 6,593,853 B1 * | 7/2003 | Barrett et al. | 340/572.1 |
| 6,816,075 B2 * | 11/2004 | Grunes et al. | 235/492 |
| 6,875,105 B1 * | 4/2005 | Behm et al. | 463/17 |
| 7,091,864 B2 * | 8/2006 | Veitch et al. | 235/375 |
| 7,113,095 B2 * | 9/2006 | Kuzma et al. | 235/492 |
| 2002/0002545 A1 * | 1/2002 | Resneck | 705/74 |
| 2002/0010606 A1 * | 1/2002 | Soga et al. | 705/7 |
| 2002/0043557 A1 * | 4/2002 | Mizoguchi et al. | 235/375 |
| 2002/0047049 A1 * | 4/2002 | Perron et al. | 235/492 |
| 2002/0054940 A1 * | 5/2002 | Grose et al. | 426/231 |
| 2002/0063760 A1 * | 5/2002 | Dietl et al. | 347/86 |
| 2002/0116399 A1 * | 8/2002 | Camps et al. | 707/200 |
| 2002/0170973 A1 | 11/2002 | Teraura | |
| 2002/0181009 A1 * | 12/2002 | Fredlund et al. | 358/1.15 |
| 2003/0063139 A1 * | 4/2003 | Hohberger et al. | 347/2 |
| 2003/0085286 A1 * | 5/2003 | Kelley et al. | 235/492 |
| 2003/0158821 A1 * | 8/2003 | Maia | 705/75 |
| 2003/0178495 A1 * | 9/2003 | Jones et al. | 235/492 |
| 2004/0026502 A1 * | 2/2004 | Tame | 235/382 |
| 2005/0038821 A1 * | 2/2005 | Wallen et al. | 707/104.1 |

FOREIGN PATENT DOCUMENTS

| | | | |
|---|---|---|---|
| DE | 198 53 226 | | 3/2000 |
| DE | 199 00 086 | | 7/2000 |
| DE | 100 27 574 | | 12/2001 |
| EP | 0 595 549 | | 5/1994 |
| JP | 2002337426 A | * | 11/2002 |
| WO | WO 00/19278 | | 4/2000 |
| WO | WO 01/91045 | | 11/2001 |
| WO | WO 02/19182 | | 3/2002 |

OTHER PUBLICATIONS

Das Druckerbuch Océ PRISMAaudit—vol. 15 p. 15-1-15-16, May 2001.

FlexChip Transponder-Technik—vol. 3 pp. 1-2, Sep. 2000.

Patent Abstracts of Japan—2000285203 A—Oct. 13, 2000.

Klaus Finkenzeller RFID-Handbuch—Carl Hanser Verlag Munchen Wien With Translation.

* cited by examiner

METHOD, DEVICE SYSTEMS AND COMPUTER PROGRAMS FOR PRODUCING AND TRACING PRINTED DOCUMENTS WITH A DETERMINATE IDENTIFIER

BACKGROUND

The disclosure concerns a method, a device system and computer program to generate and track printed documents with a unique identifier. Such documents are necessary in a plurality of applications and frequently serve to make a contextual and/or temporal correlation in the framework of a procedure organization. For example, forgery-proof documents are necessary as identification papers (personal identification, passport, driver's license, travel tickets, entrance cards, etc.) for people. Unique documents to be identified or deeds are also necessary in goods traffic, for example in the handling of customs formalities or also in the tracking of shipped goods on their way to the receiver.

In the publication "Das Druckerbuch", Dr. Gerd Goldmann (editor), Océ Printing Systems GmbH, edition 4a, Poing (May 1999), ISBN 3-00-001019-X, in chapter 14 a production monitoring and control system is specified in which a document production process is planned, supervised and controlled. The system supervises the production of documents and thereby monitors whether the documents are correctly printed and the print goods are correctly processed in the course of the further processing—for example in a cutting device, an enveloping device and/or a device for mailing. Given interferences, the system automatically initiates the reprinting of a replacement document and the separation of the erroneously processed document, such that a continuous process supervision is ensured from the generation of the document in a computer until conclusion of the production processing, for example via the preparation of the document for mailing.

To control and monitor the document production process, in the aforementioned system a plurality of computer-controlling components, what are known as managers, are provided that implement various monitoring or control tasks in the document production process. Operating data of the entire printing or pre- and post-processing processing are recorded in what is known as a systems manager. All information acquired in the execution of the document production job, for example the number, size and parameters of the jobs to be processed, their degree of completion and duration, are thereby established and the device with which the jobs were processed is thereby recorded.

Machine data of the document processing system are recorded with what is known as the device manager. Statistical machine data such as, for example, the device designation, its serial number, version of the control software, etc. are thereby acquired once into a databank. Dynamic machine data that are continuously acquired during the operation of the device, for example current device settings, error notices and capacity data (meter readings, clock speed, etc.), are thereby continuously provided with a corresponding time stamp and likewise recorded in the databank. Using these data, evaluations for individual devices or device groups can then occur and, for example, load reports, error reports or capacity reports can be generated. Such data or reports can then be exported via a user program-specific interface (application program interface, API) into other systems suitable for evaluation.

A further-developed document processing monitoring and supervision system is described in chapter 15 from the sixth edition of the publication "Das Druckerbuch" by Océ Printing Systems GmbH, of May 2001. A corresponding method, device or computer program product to monitor a document production process is known from WO 02/19182 A1.

Likewise, methods and systems are known from U.S. Pat. No. 6,137,967 with which documents are printed, the print product is registered and the entire document production process is monitored and controlled via a computer system.

From WO-A1-00/19278 A1, a printer or copier system is known in which a toner reservoir is provided with a non-contact electronic readable or writable data medium, what is known as a transponder. Dynamic data about the respective toner located in the reservoir can be recorded with the transponder and/or these data can be provided to a control in order to adjust corresponding device parameters.

From DE-A1-100 27 574, it is known to provide a planar web or paper sheet material for recording, printing or the like, whereby two-dimensionally distributed magnetizable particles are provided on the web or on the paper sheet. Magnetic information that can be used to control production processes or the like can then be stored on these particles.

In a publication by Flexchip AG with the title "Transpondertechnik", dated on 11 Sep. 2000 and available at www-.flexchip.de/deutsch/news/frames/transponder.html, it is specified where transponders can be used and how transponder systems function. It is thereby stated that corresponding chips can be integrated into paper and that such electronic markers, what are known as smart labels, can be used as goods delivery bills, as tickets for public transportation, as library cards and as entrance cards.

The aforementioned publications are herewith incorporated by reference into the present specification.

SUMMARY

It is an object of the invention to specify a method and systems with which printed documents can be unambiguously and positively identified during the print process and/or the processing events and applications downstream from the print process, and their processing and use can be controlled and changed specific to the document.

In a method and system for production of a printed document with a unique identifier, the data medium for the unique identifier is applied on a recording medium, the data medium being capable of being electronically written without contact so that data are written without contact onto the data medium in the course of a document production event. Data of at least one of a user program, of the printed document, and of the data medium are linked in a file.

DESCRIPTION OF THE PREFERRED EMBODIMENTS

Figure 1:
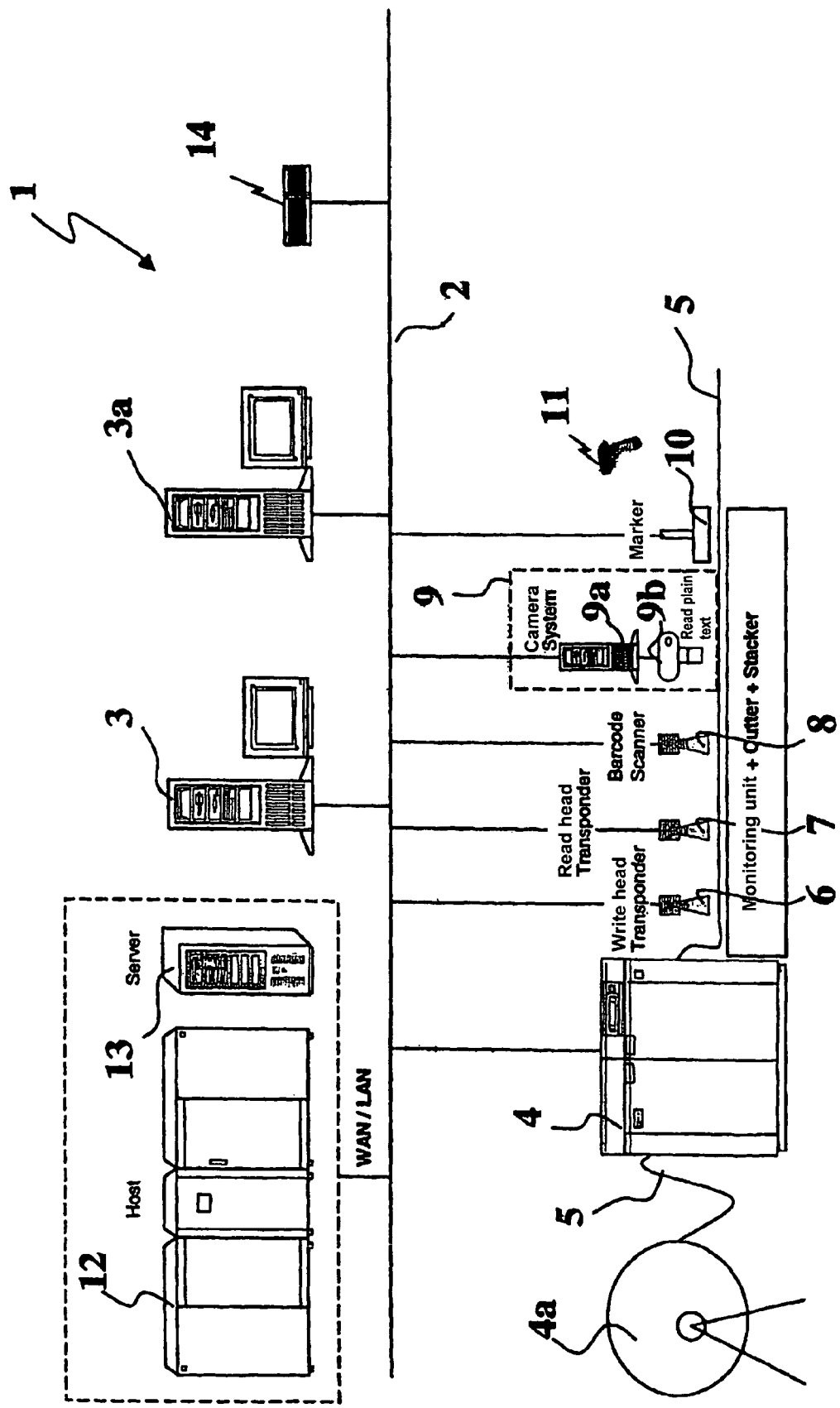
FIG. 1 shows a document production system.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

According to a first aspect, for production of a printed document with a unique identifier a recording medium is used on which a data medium with an individual detection feature is applied that is electronically readable, deletable, modifiable and/or writable without contact. The recording medium is printed with information and data are written into the data medium in the course of the document production event. Furthermore, data of a user program, the printed document data and/or the data medium are linked in a file and the file is provided for further processing of the document.

According to the first aspect, it was recognized that it is, on the one hand, possible to already unambiguously detect or to associate the printed documents from the beginning of the print event over the entire further processing or utilization chain by means of a data medium that can be electronically read, erased, modified and/or written at least partially without contact, and on the other hand it is possible to achieve the possibility to electronically store additional data and/or modified data as needed on the document. With the preferred embodiments, so to speak intelligent documents are achieved that do not serve for optical reproduction of information but rather with which information is interactively exchanged, i.e. stored and read, such that an interactive information evaluation is also possible during the use of the documents in the most different application processes, whereby predetermined information is applied on the data carrier such that it can be changed or modified.

A wide application field opens up. For example, data of product logistics can on the one hand be held in computers and on the other hand be applied on an intelligent document. The data can thereby be simultaneously stored on the document in a plurality of forms, for example on an electronic semiconductor storage that can be written or read via electromagnetic radiation such as, for example, radio frequency or RFID technology (transponder), as optical data printed in plain text, as data printed with magnetic material (what is known as MICR-printing, magnetic ink character recognition) as one-dimensional or two-dimensional barcodes on magnetic regions that are permanently connected with the document, as photographically stored information, or with other suitable storage measures. Transponders are available for sale in diverse manners and the preferred embodiment is not limited to a specific transponder type.

With the preferred embodiment, printed documents for, for example, sports contests can also be created in which a competitor, for example an athlete, is listed on the one hand in electronic lists of the organizer and on the other hand receives a printout about his participation data (age, address, start number, etc.). Such a printout can be enhanced as a document when it comprises a data medium that can be electronically read, in particular even written as well, without contact. Such a data medium can then be carried by the athlete in his competition and his presence can be detected at specific monitoring points by a non-contact monitoring point sensor. With the monitoring possibility in the document production process and the formation of a linked file, a high data integrity can be achieved, meaning it can be ensured that the production occurs completely and correctly for all event participators, meaning that each participant receives exactly one document with which he can be unambiguously identified in the competition.

With the preferred embodiment, entrance cards can also be securely (precise with regard to number) created for the user or purchaser, whereby the possibility exists to create entrance cards that are personalized but initially without validity, and to first make them valid in a later legitimation step, in that the file associated with the entrance card document is changed such that it is set from "invalid" to "valid" or vice versa if such a document were lost or stolen and the user cannot be proven as the owner.

In contrast to conventional printed documents, the preferred embodiment has the advantage that the data of the document thereby generated can subsequently be changed without anything further, for example, corrected or expanded, for example at various stations at which the document is used. The possibility to electronically read out data from the document data medium without contact or to write to this is in particular advantageous where products are difficult to access and thus a non-contact registration and modification of the document data, for example via radio connection, significantly eases the work.

The linking of the individual detection feature of the data medium with printed or otherwise associated data of the document in a file that is separate from the document enables a high degree of data integrity checking or forgery checking via a later comparison of these data. An individual detection feature can additionally also be biometric data that are stored on the transponder or at the transponder-directed databank. The biometric data of the owner detected with sensors can always be promptly compared with the stored data for an authorization.

With the preferred embodiment, in particular a sealed processing of documents is also to be enabled. For example, books can be detected from the production up to their location in a library or inclusive of the borrowing events by libraries. The documents or books can therewith be associated with a unique detection feature for their entire lifespan that is comprised of the combination of the individual data medium feature and selected data referring to the document. Using these features, they can be registered at the various stations of their processing or handling, and corresponding data can be transferred into a monitoring system. Such a monitoring system therewith allows the position and the status of the document to be made available practically worldwide over an electronic network and enables the association of these data to the person that is authorized to convey the documents and the goods at a predetermined date or the transfer of these to a next person whose ID data are likewise stored and secured corresponding to the process procedure. The association of these data with a person that is authorized to convey the documents and the goods at a predetermined date or to transfer these to a next person whose ID data are likewise stored and secured corresponding to the process procedure. Via the linking of the document data with a non-erasable property of the data medium, for example with the identifier number of a semiconductor storage stored in a read-only-memory (ROM) region, it can therewith be achieved that the documents are very well protected against manipulation. Tracking and tracing processes can be activated with this identifier number in comparison with the planned process procedure.

According to a preferred exemplary embodiment of the first aspect of the preferred embodiment, the file created in the course of the document production event is used to check the authenticity of the document in a document processing event subsequent to the document production event, such that its content is compared with read data from the document. In particular a non-erasable, electronically stored identifier number in the data medium is thereby read and the originality of the document is established using this identifier number in connection with the production of the document, the data (such as, for example, the identifier number of the data medium) stored in the file, data of the user program and/or the print data. The comparison of this data on the products or the documents with an ID of a bearer protects the overall logistical process.

Furthermore, it is advantageous to apply on the recording medium additional detection features such as, for example, an identifier number printed in plain text, a one- or two-dimensional optically-readable barcode and/or information in a magnetizable layer. The identifier number printed in plain text can thereby in particular be identical to the identifier number stored in the transponder and/or to a number stored in the optical barcode and/or to an identifier number stored in the magnetic layer (integrated onto or into the paper).

To create personalized, forgery-proof documents, it can also be provided to store unique identifiers of a person, in particular a fingerprint, data of a genetic fingerprint and/or specifications about the iris of the person on the document, and likewise to store these data in the file in the course of the document production process. The data on the data medium can in particular be stored encrypted, whereby a still-greater forgery protection is achieved.

According to a second aspect of the preferred embodiment that can also be viewed as independent of the first aspect, a production event for a printed document that is generated on a recording medium on which is applied an electronically writable data medium with an individual detection feature is secured such that the identification of the data medium, the print result and/or the electronic write resulting in are checked and, in the case of a faulty printing, an erroneous identification and/or an erroneous write result the erroneous document, including the association of the individual detection feature, is separated out and the repeated generation of the printed document is initiated.

According to a third aspect that can be viewed in connection with or also independent of both other aspects, a method is provided for production of a printed document, in that a data medium with an individual electronic detection feature is applied on a recording medium, the data medium being capable of being electronically read, erased, modified and/or written without contact. The recording medium is printed with data in a print station and, in immediate temporal, spatial and/or functional context of the print event, the electronic detection feature is read from the data medium without contact and this is linked with the printed data in a databank.

It can thereby in particular be provided to produce the connection via a temporal, spatial and/or functional forced coupling. The forced coupling can occur via a mechanical and/or electronic device and in particular via a feed device for the recording medium that leads to the printing station and to the reading station.

According to a fourth aspect, a method is provided for visitor authentication of an event by means of a computer-controlled network in which visitor identifications are used that, on a recording medium, comprise a data medium with an individual electronic detection system that can be electronically read, erased, modified and/or written without contact. A visitor identification is thereby printed in a receiver unit. The visitor identification is checked for authenticity in an input unit.

According to a fifth aspect that can also be viewed as independent of the previously cited aspects, a method is provided for monitoring of a material flow by means of a computer-controlled network in which a material-accompanying document is generated via imprinting with data in a print station from a recording medium on which a data medium is applied with an individual electronic detection feature that can be electronically read, erased, modified and/or written without contact. The electronic recording feature is thereby read from the data medium without contact in a reader station in the immediate temporal, spatial and/or functional context of the print event, and this data detection feature is linked with the printed data in a databank. In this application field, the preferred embodiment thereby also advantageously effects a very precise association of the delivery data with the bill of delivery on the one hand and a very simple identification of the goods on the other hand via the transponder component integrated in the bill of delivery, the transponder component being capable of being read via radio. In particular given goods that are unwieldy and in situations in which the dispatch note is blocked, this is of great advantage.

The preferred embodiment can also be applied in an industrial field in which product information and manufacturer specifications, for example in the framework of product liability laws, must be available for retrieval at any time, for example in the pharmaceutical field in the development or production of medicines.

The preferred embodiment can be executed with all digital printers, from card/label printers to high-capacity print devices. It is thereby advantageous when the print devices comprise a data processing connection that enables the user data with the job data for printing and to which a corresponding detection sensor technology can be coupled, and that are also networkable. The print event thereby in particular occurs with one or more electrophotographic high-capacity print devices, and the writing, modification and/or readout of data of the program module preferably occurs after the recording medium has left the high-capacity device. The data detected at the monitoring point can in particular be stored in the file generated in the course of the printing event, such that it can be registered that the document was at the monitoring point.

The various aspects of the preferred embodiment of the system and method can be summarized as follows: in a document production and tracking system, printed documents are produced with intelligent data media on which data can be electronically stored. The functionality of the intelligent data media is ensured before and after the print production event and the data stored therein is linked with data of a data source independent of the document. In the event that a document comprises a defective data medium, the document is automatically reprinted with a different intelligent data medium. A tracking of people or goods in different tracking processes can occur with the thusly generated intelligent documents.

In FIG. 1, a document production system 1 is shown in which diverse computers, a printer, as well as devices for handling of printed documents after the print event are connected with one another via a network 2. The network 2 can be a network distributed over various locations (wide area network, WAN) can be designed as a network assembled at one location (local area network, LAN). Electronic documents that, for example, comprise texts, graphics, images, films, sounds and/or combinations thereof can be generated or processed in a host computer 12, a print server 13 or a client computer.

The document data to be printed are alternately sent from the client computer 3 directly to the printer 4, to the host computer (host) 12, or to the print server 13 in which they are further prepared for printing. There, if applicable, the control data accompanying print data are received and prepared such that they can be printed out with high speed in the print device 4. Possible control information can furthermore control the print process and/or document processing steps following the print process. For this, for example, cutting devices, stapling devices, envelopers, etc. can be used. The paper web 5 drawn from the unwinding stand 4a into the print device 4 and printed is electronically written with additional data after leaving the print device 4. This writing event is implemented by means of electromagnetic radiation, in particular with radio-frequency radiation, via a transponder write head 6 to a transponder applied onto the paper web 5, the transponder being capable of being read, written to, erased and modified without contact. Immediately after this, the previously written information as well as an individual identifier number that is stored in the transponder of the document such that it cannot be erased is read with the transponder read head 7. It is then checked as to whether the identifier number and the previously written information are readable, whereby it can be detected whether the transponder is functional. In the event that the transponder is no longer functional, for example because it was damaged in the course of the preliminary method processes (for example production, shipping, storage, application on the paper, printing or affixing in the print device), the printed document is directly supplied to the marker 10 and the reprinting of the document is simultaneously initiated in the control computer 3a (what is known as a re-print). The faulty document is furthermore sorted out and destroyed.

When the paper web 5 has successfully passed the transponder read head 7, at least one barcode arranged on the document is registered with a barcode scanner 8, whereby the barcode can be designed one-dimensional or also two-dimensional. In the next method step, the information printed in plain text is read with a camera system 9 that comprises a separate camera computer 9a and a camera 9b, and an evaluation is implemented as to whether the print quality is sufficient and/or whether a document number is printed on the document in plain text. When a document is faulty, it is likewise noted in the control computer 3a that this document is faulty and therefore is to be cancelled with regard to further processing steps.

Figure 2:
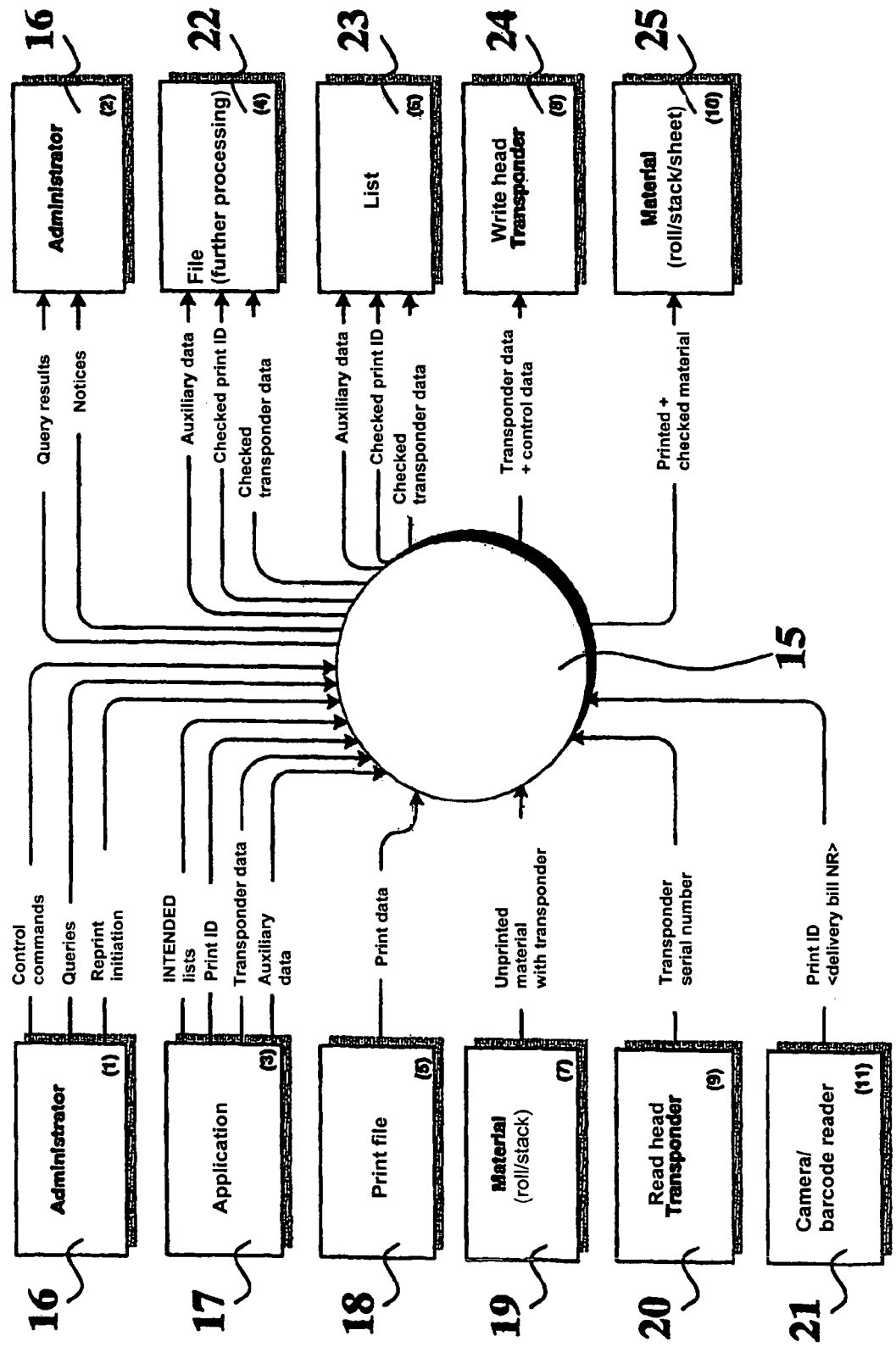
FIG. 2 shows a data and material flow of a print production system.

Additionally, in the control computer 3a diverse control data of the document are registered and mutually stored in a file (see FIG. 2). The data stored in the file can then be reached from every access point 14 that has a network connection to the control computer 3a. Alternatively to this, the file can also be transferred to another computer that is online or offline, alternately via a network transfer or also via a separate data medium such as, for example, diskette or CD-ROM.

The data stored in the transponder of the document can be made available at any time with a mobile transponder reader 11. Via the access point 14, these data can be compared with the data of the document stored in the control computer 3a or another computer, and thus the originality of the document can be checked.

FIG. 2 shows logical and physical connections in a printing system as it was described in FIG. 1. The core is thereby the ID printing system 15 to which belong, for example, the printer 4, one of the three application computers 3, 12, 13, the control computer 3a as well the reading and writing devices 6, 7, 8, 9 and 10. In FIG. 2, on the left half processes are shown that import data and/or material into the ID printing system, and on the right side are shown processes in which data and or material are dispensed from the ID printing system.

On the input side control commands, queries and requirements for a reprinting in the ID printing system are introduced by a user of the overall system via an administrator console 16. Control data are imported from one or more applications 17 that run in one or more computers 3, 12, 13 into the ID printing system, in particular what are known as intended lists, in which information is imported about documents to be printed via which erroneous or in particular missing prints can be determined. Furthermore, data of the transponder, for example the transponder serial number, can be transferred into transponders used in the various documents. Furthermore, additional date, for example for control purposes and/or for the encryption of documents/document certificates can be transferred from the application 17 to the ID printing system 15. The print file 18 contains the data printed on the document. The recording medium 19 to be printed is likewise supplied to the ID printing system. It can be a recording medium of any type, for example webs of one roll, individual pages, pre-folded materials, paper, foil etc. The unprinted material is already populated with the transponder, whereby the transponder can be glued or laminated to the recording material or can also be integrated into the recording medium material in the course of the material production.

The recording medium can additionally be provided with a magnetizable layer on which information can be magnetically stored and read. Via the introduction of magnetically coded characters, this magnet layer (ferrite elements) can also adopt the role of the data medium when it bears an identifier that is optimally difficult to delete or modify.

The serial number non-erasably stored in the transponder is imported into the ID printing system with the transponder read head 20. The printed information of the document can be registered and made available to the ID printing system 15 with the optical reading devices 21, among which are numbered the camera system 9 and/or the barcode scanner 8. For example, delivery bill data or personal data such as an address can number among these.

The ID printing system 15 is a complex regulated intelligent printing system with which the most varied results can be produced. For example, queries can be addressed to the ID printing system 15 by the administrator 16 and messages occur, for example where a specific document with a specific document number is processed at a specific point in time in the ID printing system 15.

Furthermore, the specific document data are made available in a control file 22 by the ID printing system 15. The control file contains checked data, for example data that have been read from the printed document and that have been compared (with regard to their integrity) with data supplied by the application 17. For example, in the ID printing system 15, it can be checked as to whether the transponder serial number read by the read head 20 coincides with the transponder serial number transferred from the application. Additionally, it is checked as to whether the print ID data determined by the application 17 coincide with print ID data determined by the optical reader 21. In the event that a congruence is produced, the respective checked data are stored in the file 22 which is in turn made available for later further processing steps of the document in order to in turn produce the document or data integrity at this point.

Auxiliary data, checked print identification data as well as checked transponder data are moreover deposited in a list 23. Auxiliary data can be data that have been made directly available from the user program 17 to the ID printing system, or data that originate from the print file and are directly adopted, or even data that have been printed on the recording material in the course of the print event and have been read with the optical system 21. A linking of this data then occurs in the file 22. Control data and, if applicable, other data can be stored in the transponder write head 24 attached to the document. At the end of the document production procedure, printed material 25 is output on a roll, stacked or in pages.

Figure 3:
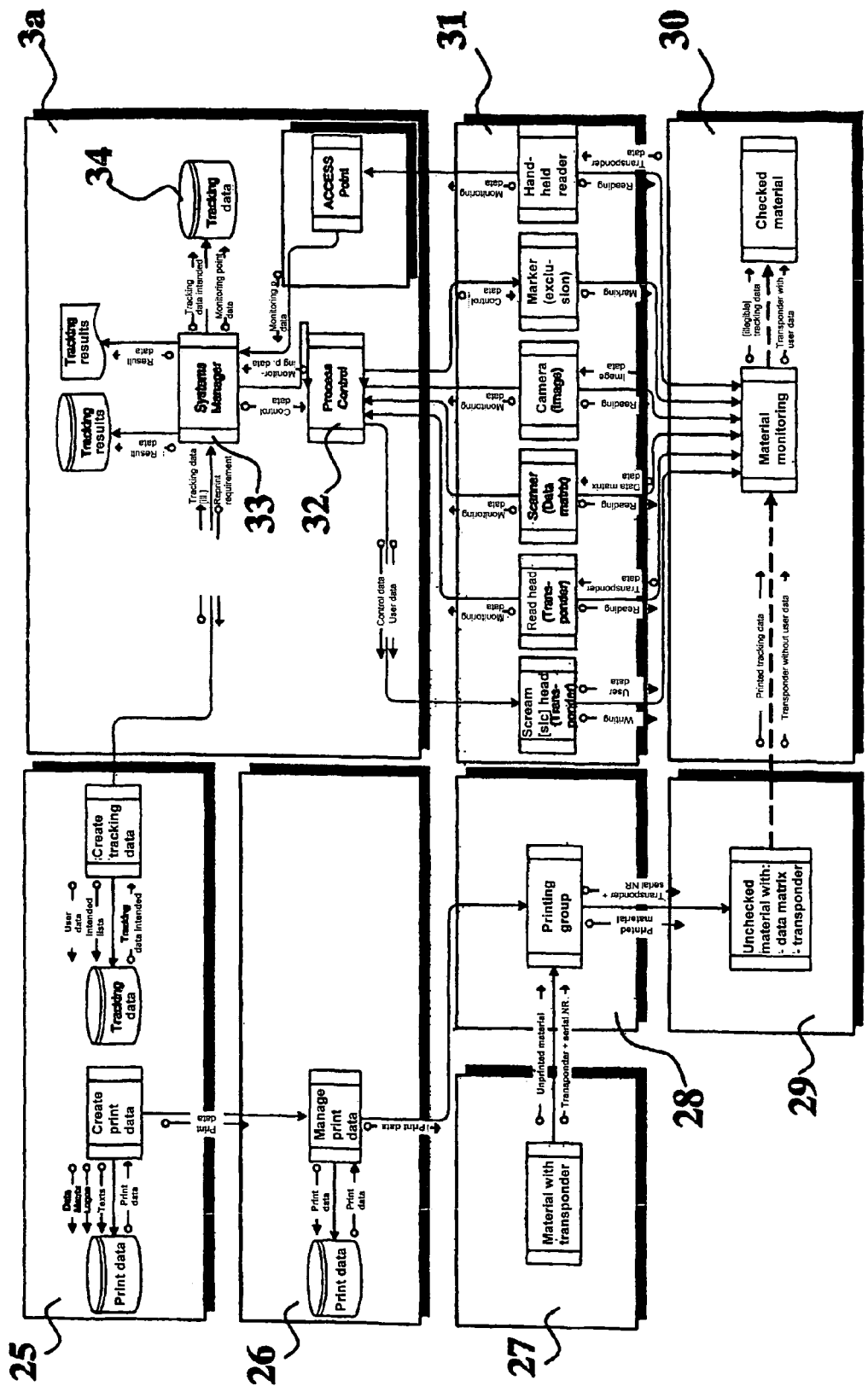
FIG. 3 illustrates components and data flows of a print production system.

System components of a printing system such as the ID printing system 15 are again shown in FIG. 3. Print data are created in a user computer 25 and sent to a print server 26. There the print data are prepared, for example converted from various input formats into a specific output format. The prepared print data are then transferred to the printing group 28. Additionally, recording material 27 (by roll, by stack or by page) is supplied to the printing group. The transponder is thereby already permanently connected with the recording material 29 before the printing. The unchecked printed material 29 on which a two-dimensional barcode (data matrix) as well as the transponder as data medium are permanently applied can be supplied to a monitoring location 30 on a roll, as a stack or as page goods. There the transponder is first checked with regard to its proper function, in that the transponder is read with a read head and the read result is transferred to the control computer 3a. A process supervision unit 32 as well as a systems manager 33 are additionally provided in the control computer 3a. The process controller 32 registers the monitoring point data with the systems manager 33 and receives control data from the systems manager. With regard to the transponder identification number, which is uniquely predetermined by the manufacturer for every transponder, the read transponder number can be compared with the data of available transponders stored in the tracking data file 34. In the event that this transponder number is identical, the transponder write head is ordered to write tracking data to the transponder by the systems manager 33 via the process controller 32. In the event that the transponder number does not coincide with transponder numbers in the tracking file 34, a command is given via the process controller 32 to the markers to optically mark the document as invalid and/or to give the command to the transponder write head to electronically cancel the document. The data matrix scanner and the camera of the monitoring unit also supply the document data detected by them to the process controller, and they are also compared (with regard to their integrity) in the systems manager with the document data stored in the control computer 3a. In the event that there are discrepancies between the read and stored document data, the systems manager 33 notifies the user computer 25 and/or the print server 26 that the respective document must be reprinted. This is then initiated by the user computer or by the server.

With the hand-held reader 11 of the monitoring unit 31, it is possible in application to detect the printed document at practically any point, to read the data stored in the transponder, on the control computer 3a to supply it to the systems manager 33 via an interface (access point), and in turn to save data from the systems manager 33 about the hand-held reader in the storage chip of the document. This is, for example, of great advantage given application of goods shipping because it can be documented at the various stations of the goods shipping that the goods are present there at a specific point in time. Via the contact-less communication between the transponder chip and the hand-held reader 11, it is possible to also be able to read only poorly-accessible transponders, for example when a goods palette to be detected is delivered with other goods. Goods and documents or people that are provided with different transponder ID numbers can therewith be evaluated for tracking.

Furthermore, it is possible to advantageously also use the cited concept only in the detection and tracking of personal data, for example in the field of identification printing and in the field of sporting events in which each participant carries a transponder chip and is detected at specific monitoring points. The invention thereby allows the error-free production of documents in which the person and start number data specified in electronic start lists are compared with that on starter documents, including the employed transponder chip.

Figure 4:
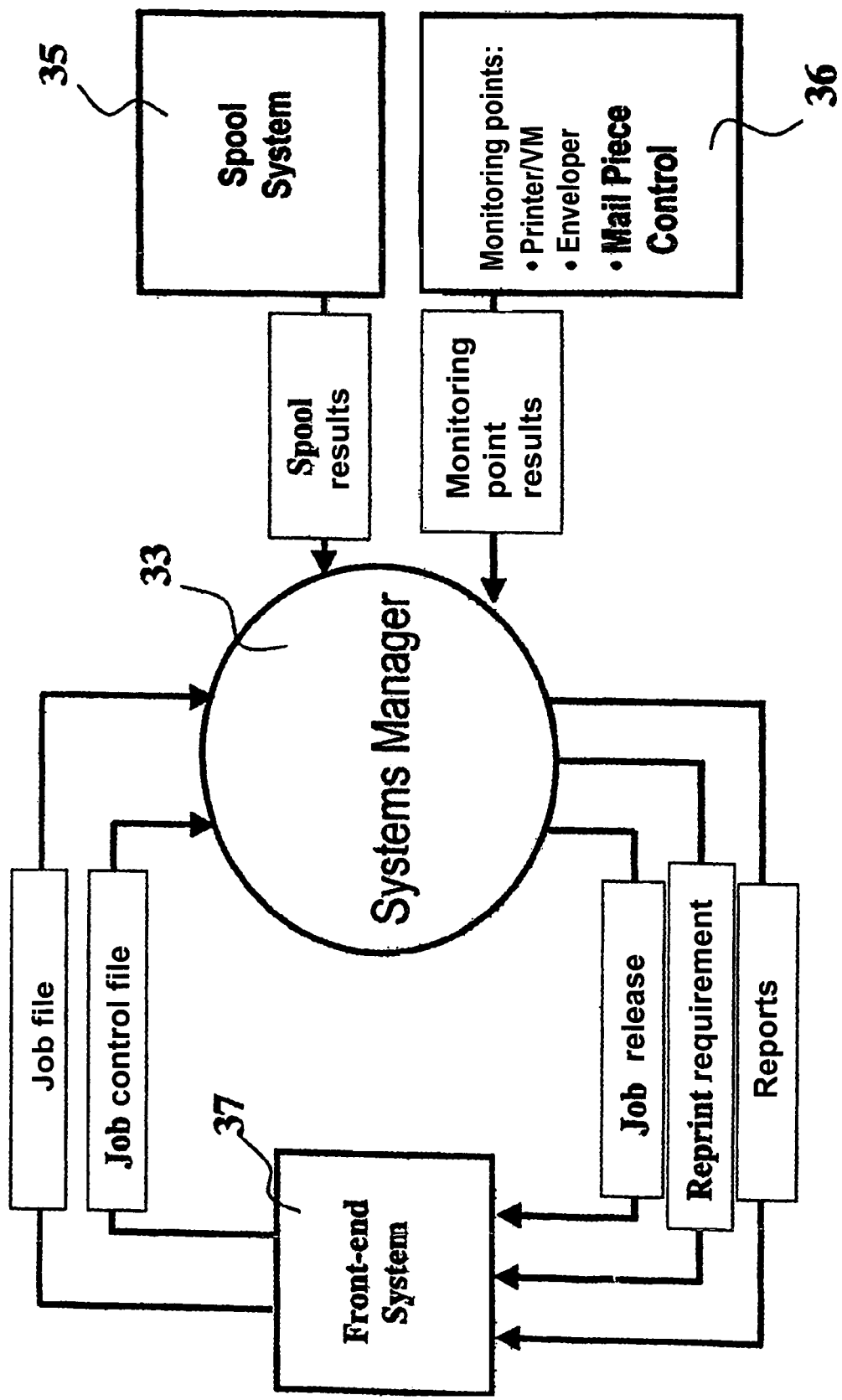
FIG. 4 shows a data flow diagram for a print production control.

FIG. 4 again shows some functionalities of the systems manager 33. It receives spool results in the form of control data from a spool system 35 in which the print files have been transferred to a print server or to a printer. Furthermore, the systems manager 33 receives the data detected at various monitoring points such as, for example, a printer, an enveloper or a monitoring location for mail shipments (mail piece control) and controls the printing event in the printing system 37 based on these results. In addition to this, it releases print jobs, requests repeat printings and reports from the printing system, and receives from this a job monitoring file as well as a job file.

Figure 5:
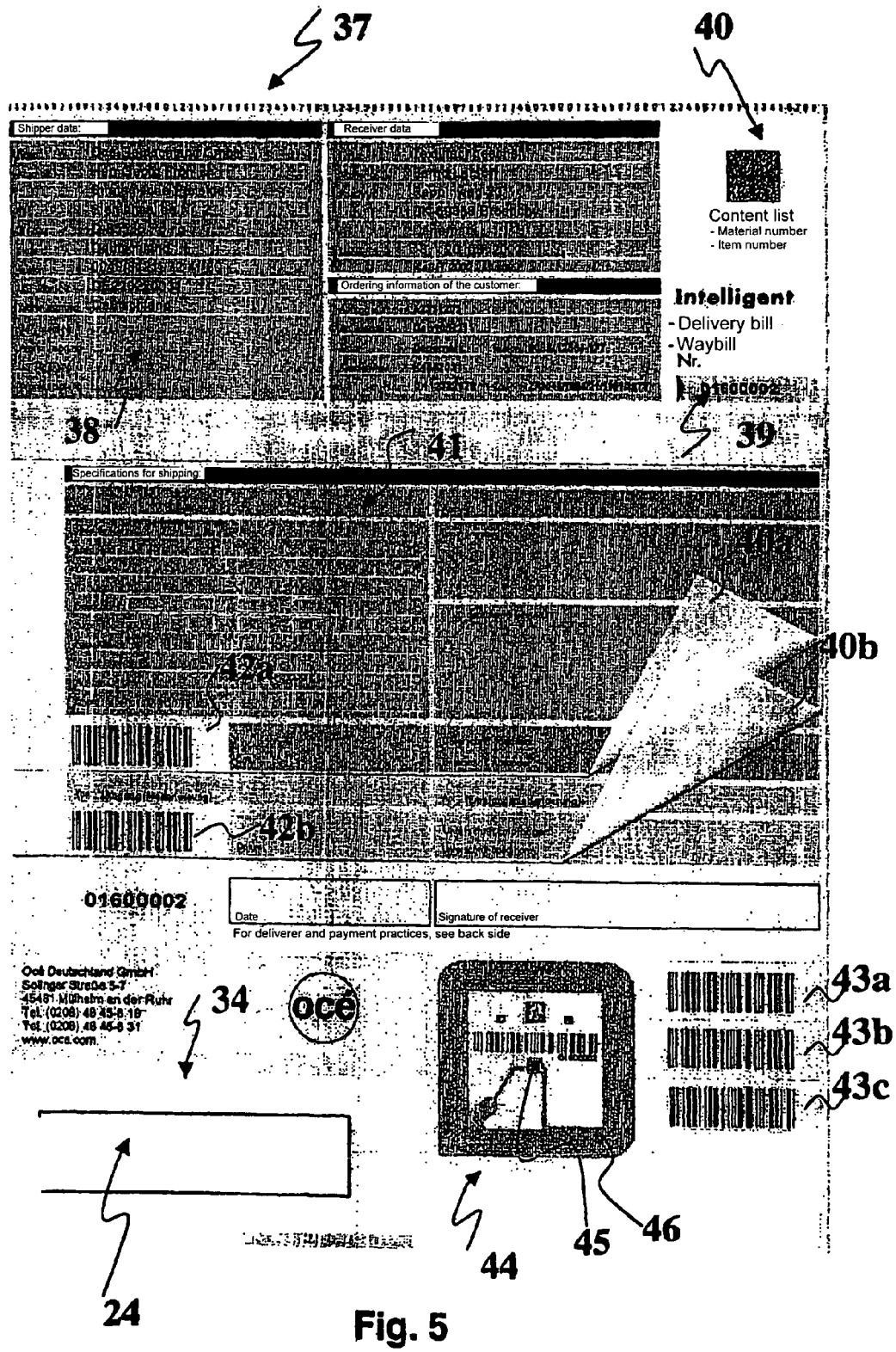
FIG. 5 shows a printed document.

In FIG. 5, a printed waybill document 37 is shown on which various information such as name, address etc. of a sender are printed in an upper region 38, as well as names, address of a receiver and a waybill number in a plain text field 39. The information present in the regions 38 and 29 are furthermore stored in a two-dimensional barcode (data matrix) 40. Further specifications regarding goods type and regarding other information accompanying the dispatch of goods can also be stored in this barcode field.

The printed waybill document 37 moreover has a receipt region 40 in which specifications for shipping can be placed and a plurality of overlapping receipts 40a, 40b are provided along a tear-off line 41 as intermediate receipts for various reader situations. Printed on each receipt 40a, 40b are respective one-dimensional barcodes 42a, 42b in which data specific to the shipping order (such as sender, receiver, waybill number and/or the manufacturer number of the transponder 44 laminated onto the waybill) are stored. In the lower region, the printed waybill document 37 furthermore comprises adhesive labels 43a, 43b, 43c that are identical to the barcodes 42a, 42b. They are additionally disposed for being glued to the transported goods. The goods can therewith be unambiguously associated with the waybill via the unambiguous association of the waybill number and/or the non-erasably stored serial number of the transponder 32. The transponder 44 comprises an electronic transponder chip 45 as well as a transponder antenna 46. On the one hand, the transponder serial number is non-erasably stored in the transponder chip 45, and on the other hand a writable, modifiable and/or erasable storage region is provided in which application-specific data can be stored, read and modified. In the region 34, the document additionally comprises a magnetizable layer 24 in which document-related data, in particular the transponder number, can likewise be stored. Here as well it is true that for people to whom a unique ID number (per identification) is associated, this ID number can be compared with the ID number of goods and documents in order to secure and to track event processes.

Figure 6:
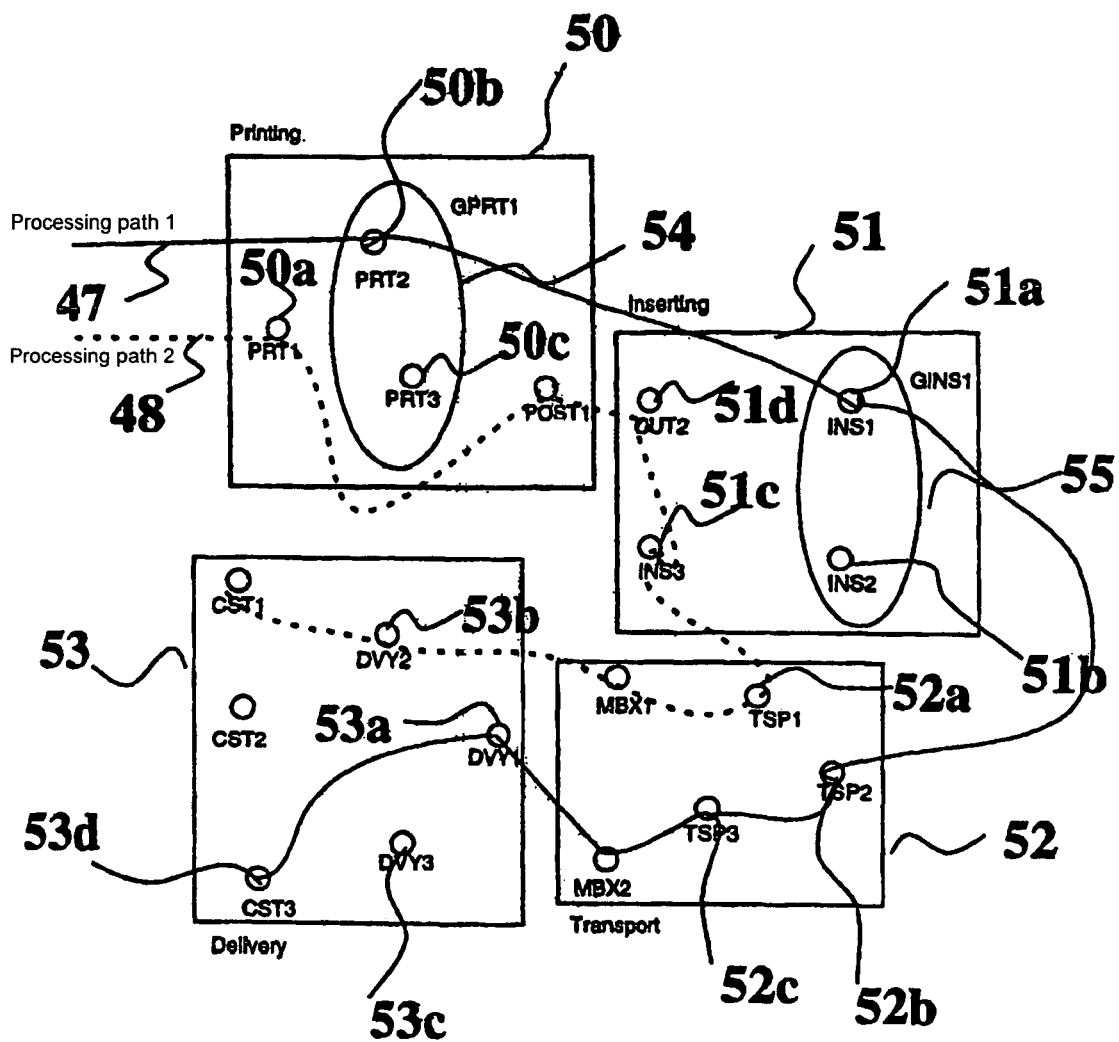
FIG. 6 illustrates two processing paths with monitoring points for two documents.

In FIG. 6, two processing process as for two recording media 47, 48, for production and processing of printed documents are shown that comprise various process stations and monitoring sites. In a printing process stage 50, three different printers 50*a* (PRT1), 50*b* (PRT2) and 50*c* (PRT3) are shown; and in an enveloper process stage 51 three envelopers 51*a* (INS1), 51*b* (INS2) and 51*c* (INS3) as well as a cutting device 51*d* (CUT) are shown. In a transport process stage 52, three transport systems 52*a* (TSP1), 52*b* (TSP2), 52 c (TSP3) are provided. In a delivery stage 53, three mailbox systems 53*a* (DVY1), 53*b* (DVY2) and 53*c* (DVY3) are provided.

In such a system, a plurality of combination possibilities of the devices that are individually interconnected (depending on the print job) for processing of the job consequently occur. For example, a first processing path 47 correspondingly results in which a document is printed with the printer 50*b*, inserted with the enveloper 51*a*, and then passes through various transport devices 52 a, 52*b* before it is supplied to the mailbox systems 53*a* and 53*c* and is prepared for mail shipment in an output station 53*d* (CST3).

A second processing path 48 for a different document production job is printed by the printer 50*a*, passes through a buffer POST 1 and a cutting device CUT 2 before it is supplied to the enveloping device 51C (IMF 3) and, via the subsequent transport devices 52*a* (TSP 1) and MBX 1, is supplied to a mailbox system 53*b* (DVY 2) and is output at the output station CST 1.

The document production system can thus be very flexibly configured and can easily be adapted to the respective requirements of the print job such as desired production speed, additional insertion of pre-printed material in the enveloper, etc. Both the selection of the participating processing devices and the selection of the corresponding monitoring points are thereby freely configurable. An arbitrary number of monitoring points can thereby be associated with each device and vice versa, such that an N to M relation results between the number of the devices and the number of the monitoring points. N and M designate whole numbers.

Devices and monitoring points can thereby also be combined into groups when the processing path at one processing step can pass through more than one monitoring point and respectively the same operating personnel is associated with the monitoring point or the device. For example, in FIG. 6 the devices or monitoring points 50*c* and 50*b* are combined into a printer monitoring point group 54 and the envelopers 51*a* and 51*b* are combined into enveloper monitoring point group 55.

At the respective monitoring points, the document data are selectively checked with regard to the data integrity and, in the event that it is necessary, a rejection and a reprint of the document is initiated. For this, a comparison of the document data is implemented with the input quantities of the ID printing system (compare FIG. 2) and/or with those of the created file.

Figure 7:
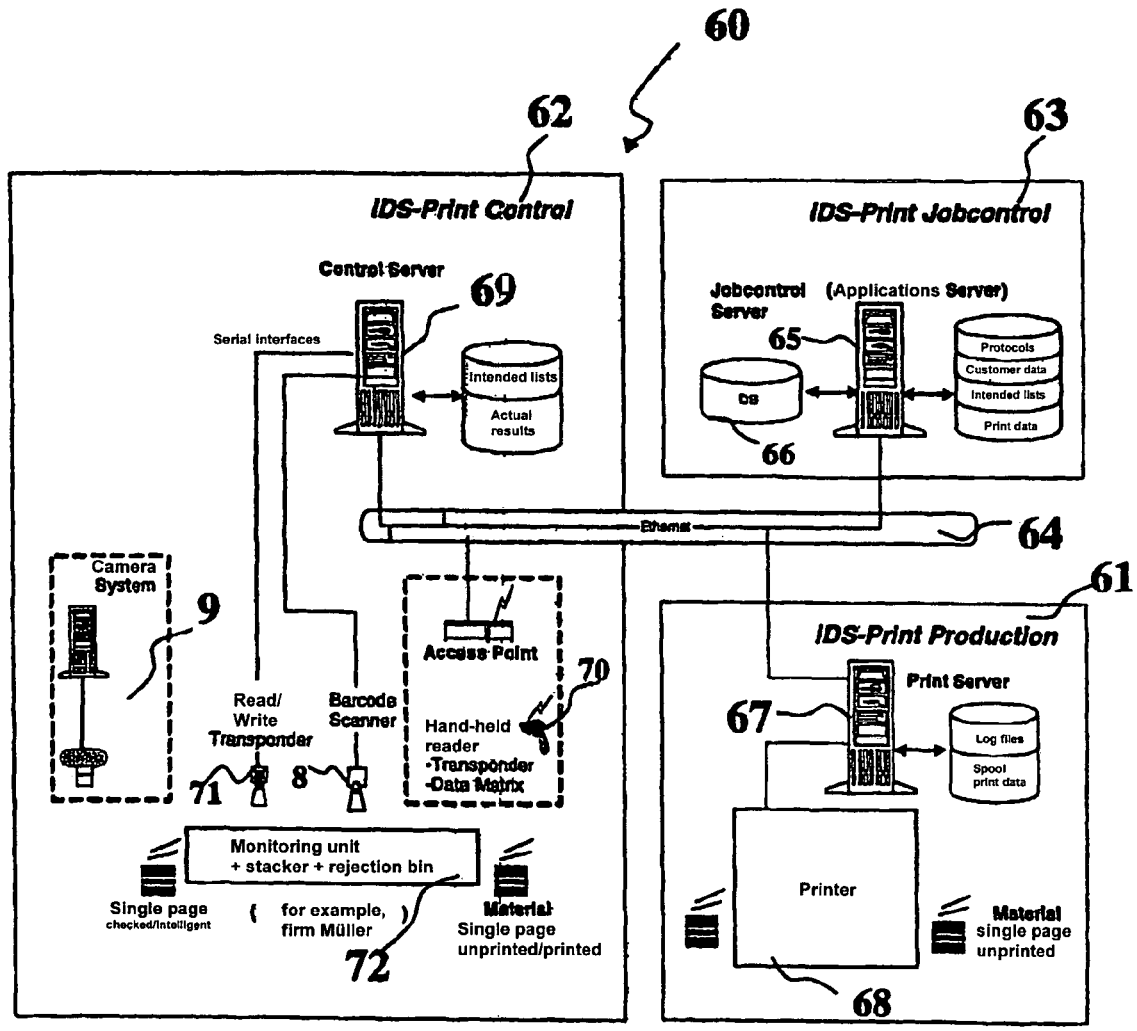
FIG. 7 shows a second document production system.

In FIG. 7, a document production system 60 corresponding with document production system 1 (FIG. 1) is shown in which, instead of a printing device that prints on web-shaped recording media, a printer device is provided that prints on individual pages. Other, significantly identical components are respectively provided with the same reference characters in FIG. 7. The second document production system 60 is divided into four function blocks, namely into a print function block 61, a print monitoring function block 62, a print job function block 63 and a network connection 64 with which various devices of the function blocks are connected with each other in terms of data. Comprised in the print job function block 63 is a job monitoring server 65 (application server) that assumes the significant functions to create the print jobs and for monitoring of the correct printout of the print jobs. In particular it realizes the following functions:

1. Creation of personalized print jobs via merging of a static layer (master) as well as a variable layout in which the variable contents are extracted from the databank 66 and, if applicable, the input of modified data into the databank 66.
2. Creation of personalized print data
    The data of the layout master are thereby connected document-by-document with the variable contents of the databank 66 and original print data are thus generated. The creation of what is known as an intended list, with which the correct creation of the documents can be monitored document-by-document, is linked with the original print data. In order to reprint a specific document after an error printing and to monitor this print event, if applicable a reprint list is created.
3. Creation of tebt test print data
    With this function of the job monitoring server 65, test data can be printed out for the purposes of the demonstration or, respectively, of the test. Unless necessary, no intended list is thereby generated.
4. Creation of non-personalized print data
    With this function, forms can be generated that are supplemented with personalized data at a later point in time, for example also with an external card printer (here not shown). The function is in particular suited for pre-printed forms in color and post-printing the personalized data in the color forms in a later printing event. No intended lists are necessary for the form printing.
5. Distribution of the print data
    With this function it is possible to break down a larger print job into smaller blocks, which is in particular advantageous when a print device that has a relatively small storage capacity is connected with the print system, such that the larger print job cannot be completely taken into the storage of the print device.
6. Master storage
    Given execution of the complete print job with the personalized data from the databank 66, the data of the form (master) are then retrieved from a storage of the print device.
7. Monitoring data
    With this function, the job monitoring server 65 exerts the control over the current print job, creates/collects protocol data and creates/collects statistical data.

In the print function block 61, a print server 67 is contained to which a print device 68 is connected. The print server 67 is in a slave-master relationship with the job monitoring server 65, whereby the incoming print jobs in the print server 67 are handled in succession in the order of their input, meaning are automatically scanned and are placed in a print queue. The print device 68 is fashioned as a single page print device (cutsheet printer), whereby the operator starts and stops the device and selects the materials used for printing. The current print status is detected in the print device 68 and communicated to the job monitoring server 65. In particular upon deletion of print jobs by the operator, the appertaining job must be re-set up again by the job monitoring server 65.

Furthermore, the following functions are available on the control server:

1. Intended lists that can have been transferred from the job monitoring server 65 to the control server 69, possibly sorted according to serial number, are managed.
2. Print identification numbers (for example serial numbers) that have been read from the document by means of the barcode reader 8, the hand-held reader 70, the camera system 9 and/or from the transponder by the read/write head 71 are checked for integrity with the numbers of the intended list.
3. Transponder data, in particular the transponder identification number, can be read; in particular writing events of the read/write head 71 can also be initiated.
4. Creation of actual results on an individual-page basis as well as association with the corresponding read transponder data. Transfer of the actual results to the job monitoring server 65 on an individual page basis.
   Control and adjustment of a monitoring device 72; evaluation of the actual results for the purposes of disqualification.

The following situations are thereby possible:

a) Unprinted material with integrated transponder is tested. Individual pages with defective, non-readable transponders are rejected, meaning the functions 3, 4, 5 and 6 of the control server 69 are active.

b) Printed material with integrated transponder but non-personalized print is tested; the individual pages have no print identification number but individual pages with defective, non-readable transponders are rejected and the functions 3, 4, 5 and 6 of the control server 69 are active.

c) Printed material with integrated transponder and personalized print is tested, meaning a print identification number is present. Rejected are: individual pages with defective transponders, individual pages in which the print identification number occurs doubled, individual pages whose print identification number is not present in the intended lists, and individual pages in which the print identification number can not be read by means of camera system 9 and/or barcode scanner 8, i.e. the functions 1, 2, 3, 4, 5 and 6 of the control server 69 are active.

The recording material of the document production systems 1 or 60 is in particular comprised of paper, however can also be comprised of any other printable material such as, for example, plastic or metal or a combination, for example in a layer design.

Not only black-and-white printers but rather also combinations of printers can be provided as print devices or printing systems; for example, two individual page or continuous web printers as well as color printers and black-and-white printers can be combined with one another connected in series. Although respectively separated read heads and write heads are described for the transponder in FIGS. 1 and 3, a combined read/write head can also respectively be used there.

The previously specified document production systems based on transponders are also called iDS-print in the scope of this specification, whereby iDS stands for identification system. In addition to iDS-print, the iDS also comprises iDS-event and iDS-logistics which are subsequently specified.

Figure 8:
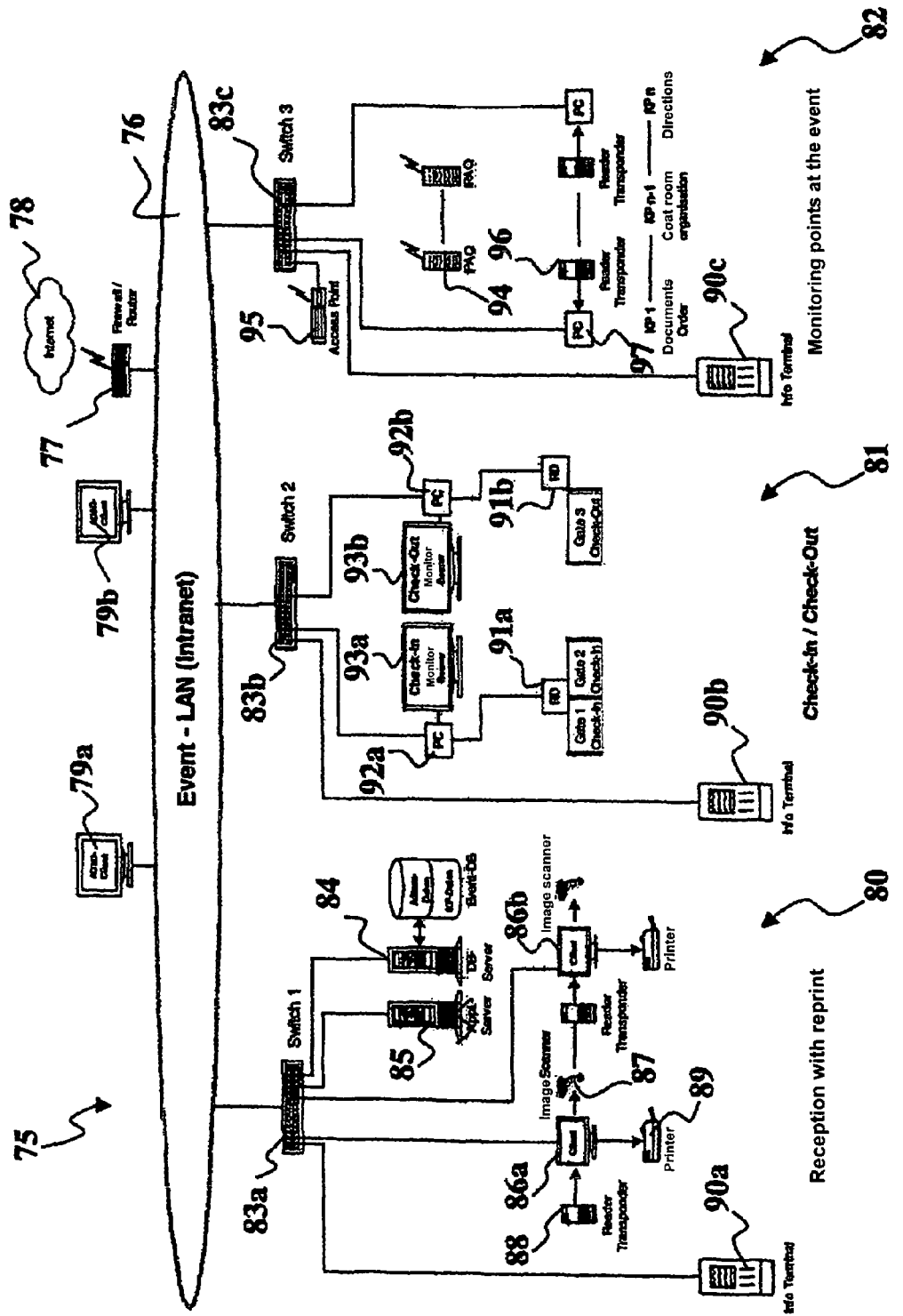
FIG. 8 illustrates a visitor management system for events.

In FIG. 8, a transponder-based event management system 75 (IDS event system) is shown. It comprises a local network 76 (intranet) that is connected with the internet 78 via a router 77 or a corresponding firewall. Various terminal computers 79a, 79b are directly connected to the intranet 76. Furthermore, three functional groups that are connected to the intranet 76 via 3 switches are provided on the intranet 76. The functional groups correspond to 3 functional units that are necessary in an event such as a fair, a concert or the like, namely a receiver unit 80, an entrance/exit unit (check-in/check-out) 81 and a monitoring point unit 82. Depending on the size and accommodation of the event, the individual units with the devices associated with them can be associated with a proprietary switch or can be combined into a mutual switch. In the example shown in FIG. 8, the receiving unit 80 is connected to the intranet 76 via a first switch 83a. Associated with the reception area is the databank server 84 on which the data recorded by the event administration from the visitors are administered and, for example, are used in order to be able to subsequently print a personalized document via single page/card printers, for example given loss of an identification/document. Numbered among these are in particular address data and monitoring point data such as the point in time of the entrance or exit of the fair, statements of the visitor about focal points of interest, data about the visit to specific fair booths, data about the deposit of pieces of clothing or luggage in the coat room, association of the visitor with a specific visitor group (press, producer, customer), etc. Not only can the data be administered with the databank server 84, but rather all possible evaluations of data occur with a databank. Furthermore, for linking the data in other documents or further processing of the data in other user programs, an application server 85 is connected to the switch 83a. Furthermore, various client computers 86a, 86b are connected to the first switch 83a with which arriving customers for whom no fair identification has been printed beforehand can be newly registered and a new fair identification can be printed for them. For this, his personal data (such as name and address) are registered by the customer. This can either occur manually by means of a keyboard or via an image scanner 87 that scans a business card and transfers the data to a text recognition program in the application server 85. To create an identification, a blank identification that is provided with a transponder, the blank identification having been personalized in a new registration, for example via a card printer, is drawn through the transponder reader 88, whereby an individual identifier number stored in the transponder is detected and is supplied with the address data of the visitor in the databank server 84 or in the application server 85. It is thereby ensured for the fair event that a correct association with the data of the customer ensues at every monitoring point at which the data of the transponder is read. In a further-developed exemplary embodiment of the receiving unit 80, the data of the transponder is not just read in the transponder reader 88, but rather specific customer data such as his name, address, firm association etc. are stored in the transponder via a corresponding write capability of the device 88, such that the transponder is also inherently an individual document for the affiliation of the identification with a person. To print entrance cards, a print device 89 is provided in whose infeed region is mounted a transponder reader 88a. For printing, the blank form previously scanned in the transponder reader 88a is fed into the print device 89 and specific data of the visitor, in particular his name, first name and firm affiliation are printed on the entrance card. The data read in the transponder reader 88a are simultaneously transmitted to a central Databank server 84 in which they are linked with the printed visitor data. With his freshly printed entrance card and the transponder located on it, the visitor can then already retrieve current fair data (such as a fair plan, current lecture events or the like) in the reception area of the event at the info terminal 90a connected in the receiving unit 80. For this, the transponder number and/or the name information of the user stored in the transponder are detected in the info terminal 90a by means of an integrated transponder reader and the transponder data are compared in the databank server 84 with the data stored in the databank server 84, such that it can be decided which event data are shown for the respective visitor. For example, in fairs whose lecture events are linked to separate entrance fees, the lecture event displays only those visitors that have paid the corresponding fees. Personal data of the visitor can also be unlocked for display on the info-terminal 90a via the transponder data, such as, for example, identification data and/or the location of his coat room or other personal articles.

In an event, the check-in/check-out unit 81 stands in the area of the entrance/exit gates. It is connected to the intranet 76 via a switch 83b. A transponder reader 91a that is connected to the second switch 83b via a computer 92a is provided at the entrance gates (gate 1 or gate 2). A monitor 93a connected with the computer 92a in particular serves to specifically greet the visitor that enters through an entrance gate into the event site and whose identification is detected by the reader 91a, for example via display of the visitor name. Instead of a monitor, a corresponding beamer, if applicable with screen, can also be used. In the fair site itself, in the area of the entrance/exit zone an information terminal 90b can in turn stand on which the visitor can inform himself individually or regarding the fair overall. In the area of the exit gates, a corresponding transponder reader 91b, a computer 92b and a monitor 93b connected therewith can be provided on which in particular a visitor-individual departure text can be mixed when the visitor leaves the fair. Various monitoring points KPi are provided for data input/data output operations on the event site, whereby i is a natural number. They are incorporated into the monitoring point unit 82 and connected with the intranet 76 via a third switch 83c. The monitoring points can be provided for the most varied purposes, for example to retrieve personal or general fair information via an info-terminal 90c, to order documents, for coat room organization in the coat room area or for organization of directions over the event site and/or over individual fair booths. The devices of the monitoring points can thereby either be directly connected to the third switch 38c, and thereby be connected with the intranet 76, or there can be what are known as IPAQ stations that are connected to the third switch 83c via a wireless network (WLAN) and an access point 95. Transponder data can both be read and/or written without contact via the IPAQ stations 94 and data, including tracking data and auxiliary information, can be retrieved from the databank of the databank server 84 or be written into this. Furthermore, event information such as hall plans, price information, etc. for visitors and exhibitors can be pre-installed on the IPAQ stations.

The IPAQ stations are mobile stations and therewith variable monitoring points. In addition to these monitoring points, fixed monitoring points with transponder read and/or write devices 96 can also be provided in the event area. These are in turn connected to the third switch 83c via PCs 97, and therewith to the intranet 76. Access gates that particularly protect the inner areas of the event site can also be provided as variable monitoring points, as they are already provided in the check-in/check-out unit.

Variable IPAQ stations 94 and/or wire-connected monitoring points 96, 97 can also be provided in the reception area, in particular for coat rooms and luggage protection services. It is thereby in particular provided to store the respective coat room number for clothing or luggage on the transponder of a visitor identification and to store the same information in the databank of the databank server 84. A doubled protection of the coat room information is thereby given that is advantageous both for the case that the databank connection has failed and for the case that a visitor identification has been lost. In both cases, a secure association and therewith disbursement of clothing and luggage can occur using the personal identification (name, address). It can additionally be provided that the visitor has the possibility to inform himself as to where his coat room or luggage is stored via an arbitrary information terminal 90a, 90b, 90c or via an IPAQ station 94 by means of the transponder-based visitor identification. This is in particular advantageous when the coat room is divided into a plurality of coat room areas and the visitor has forgotten the exact location of his coat room deposit.

Figure 9:
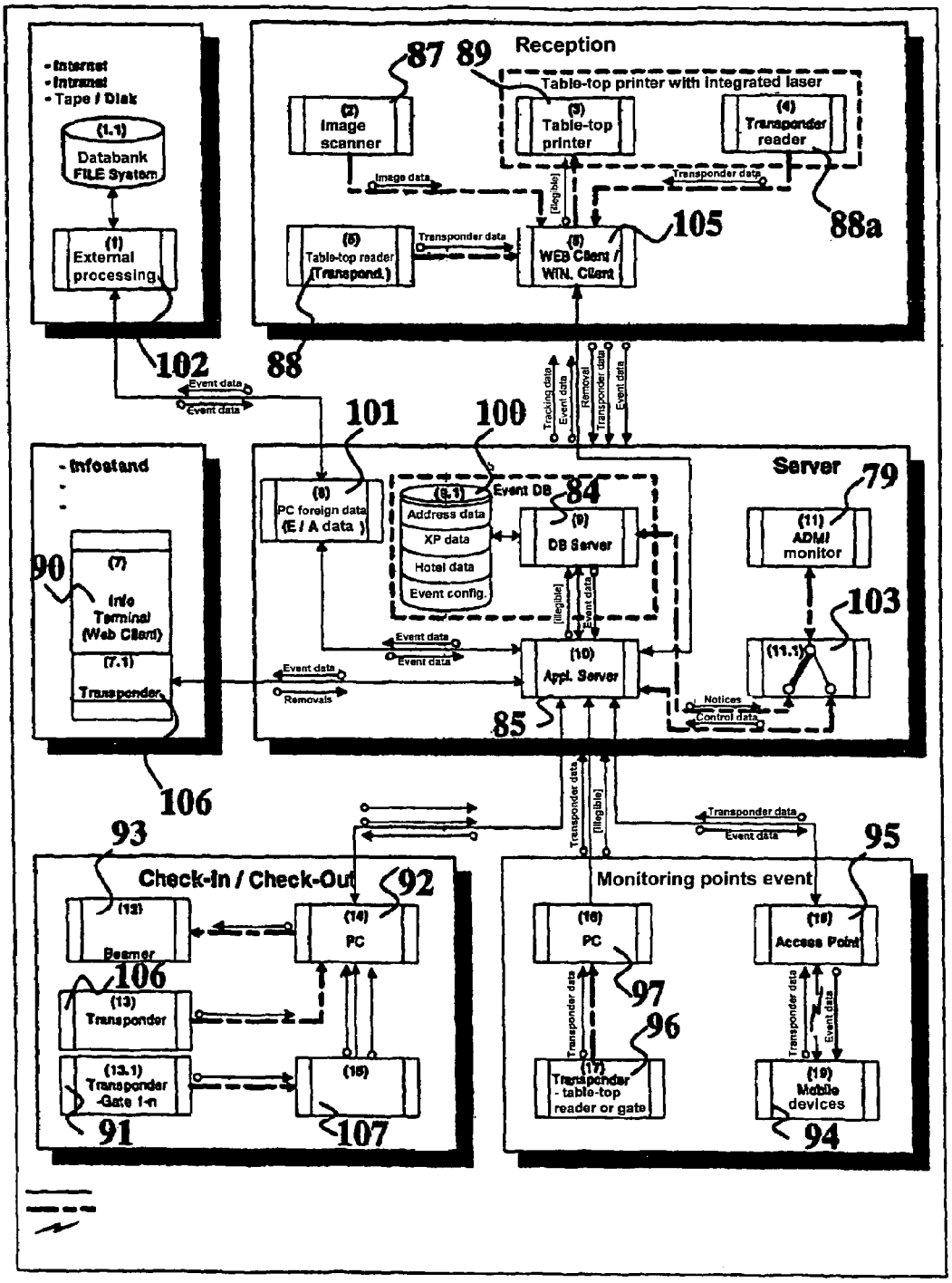
FIG. 9 shows data-related details of the system according to FIG. 8.

FIG. 9 shows the data processing-related structures of the IDS event system with its central hardware components, their main connections and data flows. In the connections, solid lines represent a wired network connection such as, for example, a 100 Mbit Ethernet connection. The transfer provided with lightning symbols is a radio link, meaning wireless network connection. Point-to-point connections between two hardware components are shown with dashed lines. The core of the implementation is the databank server 84 and the databank 100 associated with it. The storage of the event data which are supplied by the application server 85 occurs via the databank server 84. Exclusively the databank software with associated application software for swapping in/out the event data runs on the databank server. All operating systems are suitable as an operating system, for example Windows/NT, Unix or Linux. All event data are contained in the databank 100. All data types are suitable for the databank, in particular SAP databanks, Microsoft SQL, Oracle, Informix or SYBAFE. Furthermore, databank data can be read in from external databanks via an interface 101. The interface 101 can in particular comprise an independent computer with which the foreign data are processed in a predetermined format adapted for the databank 100. Furthermore, an unauthorized access by a foreign system can be repelled via the corresponding computer. In particular given import of the foreign data via data media (CD, diskette), these are checked for viruses before the input data is imported into the IDS event system. In particular inputs such as address data, hotel reservation data, etc. can be transferred from external processing computers 102. In addition to the aforementioned recording media, the data transmission can also occur via intranet, internet or tape drive. An administration monitor 79 that optionally allows a switchable operation/display between the two servers via a change-over switch 103 is connected to both servers 84, 85.

An IDS event computer program that preferably runs on the application server 85 is provided for the overall control of all devices and computers connected on the local network. It controls the overall data traffic between the participating in/output devices and the databank server 84. The IDS event computer program can optionally also run on the databank server 84 in smaller implementations, meaning in systems in which only a few system components, in particular monitoring points, are provided, whereby then the application server 84 can be foregone. The IDS event computer program then runs on the databank server 84 in addition to the databank computer program. In this case, further programs that otherwise run on the application server 85 henceforth run on the databank server 84.

In the reception unit, the image scanner 87 is provided that is connected with a Windows client 105 of the reception computer 86a via a point-to-point connection. The image scanner 87 is additionally connected with a Web client 104 of the reception computer 86a via a network connection. The point-to-point connection or network connection can respectively also, vice versa, be a network connection or point-to-point connection. A plurality of variants are available for input of the visitor data. In a first variant, the visitor data are manually input via the Windows client 105 from submissions such as business cards. In a second variant, the visitor data is scanned with the image scanner 87 from the submissions in order to be able, for example, to record the customer data as an image quickly and without wait time for the visitor at the reception. A unique association between the recorded image and the visitor number or transponder number of the associated visitor identification thereby already occurs. The electronically recorded image can then be used at a later point in time in order to input the customer data or a remaining remnant of the customer data into the IDS event system via the input masks. In the input, it is ensured that no confusions of customer data and customer numbers can occur. The mask inputs can occur both via the Windows client 105 (application client) and via the Web client 104. Both the Web client 104 and the Windows client 105 are equipped with a password function, such that different functions can be executed on the application server 85 or the databank server 84 depending on the user and his authorization clearance. Depending on the scope of functions and requirement various Windows and/or Web clients are installed within the overall system. The Windows clients 105 thereby access the IDS databank 100 via the databank server 84. The Web clients 104 access the IDS databank 100 via the application server 84. The Windows or Web clients have a point-to-point connection or a network connection to the image scanner, to a transponder/write device and/or to a printer as needed.

In an event, the print device 89 in the reception unit is preferably used to print identification for visitors that have not registered/applied beforehand. Furthermore, with this print device 89 it is in particular provided to reprint identifications that have been lost, for example on the part of the organizer due to logistical problems or on the part of the visitor after receipt of the original visitor identification. Upon reprint of visitor identifications, it is in particular provided to flag the lost identification as invalid in the IDS databank 100, which in particular occurs via the transponder identification number. If this identification later turns in particular at one of the monitoring points, all functions available to the visitor are blocked and, if applicable, a notice is output on a display device that this identification is blocked.

For the printout of an identification in the reception unit, a print device 89 is used that can print both paper and plasticized material. Upon printing the identification, it is to be ensured that the correct number of the transponder is brought together with the correct address data of the visitor, i.e. that the data on the identification coincide with the data of the IDS databank 100. For this, it is provided that the detection of the transponder identification number occurs in immediate temporal, spatial and/or functional connection with the printing of the identification. In particular, given an integrated transponder within the identification, it is provided to read the transponder identification number within the printing event and to associate the printed name or the corresponding address in the databank. A temporal association can thereby occur in the manner that respectively only one identification is printed and the identification is detected immediately after the printing with an integrated reader or via a table-top reader 88 and is associated with the previously printed name or the address. Vice versa, it is also possible to first detect the transponder identification number and then immediately after this to print the identification, whereby a next identification is only printed when the association event of a previously printed identification is completely concluded. Furthermore, a spatial association can occur in that the transponder read device 88 is arranged directly next to the input region of the table print device or directly next to the output region of the table print device. However, the most secure solution for an unambiguous correct association between transponder identification number and name/address of the printed data is a functional required coupling between read event and printing event. It can, for example, hereby be provided that the identification is input into a restricted guidance and then is transported completely automatically through the transponder device or the reverse.

Visitors, manufacturers, exhibitors and press can inform themselves about the event via the info terminal 90, whereby different rights can be associated with the respective group. Information can therewith be stored up for individual people. The application occurs via password or via the transponder identification number contained in the identification. The info terminal 90 is additionally designed as a Web client and accesses the IDS databank 100 via the application server 85. The Web client of the info terminal 90 is additionally furthermore connected with a table-top reader for transponders via a point-to-point connection. A computer that in particular displays greeting texts and name data on the monitor 93 is provided in the region of the entrance/exit sluices. Table-top readers for transponders 106 or transponder gates 91 can optionally be used at the sluices. Converters 107 are provided in order to use a plurality of transponder gates at an entrance/exit point.

In the monitoring point unit, transponder readers 96 such as a table-top reader or gate are provided that are connected with the monitoring point PC 97 via network connection or point-to-point connection. As a supplement to or instead of this it a miniature computer 94 can be provided that has an interface for wireless network connection to a connection point 95. The miniature computer can furthermore in particular comprise a unit to read the transponders and possess the possibility to store or select the event data.

Figure 10:
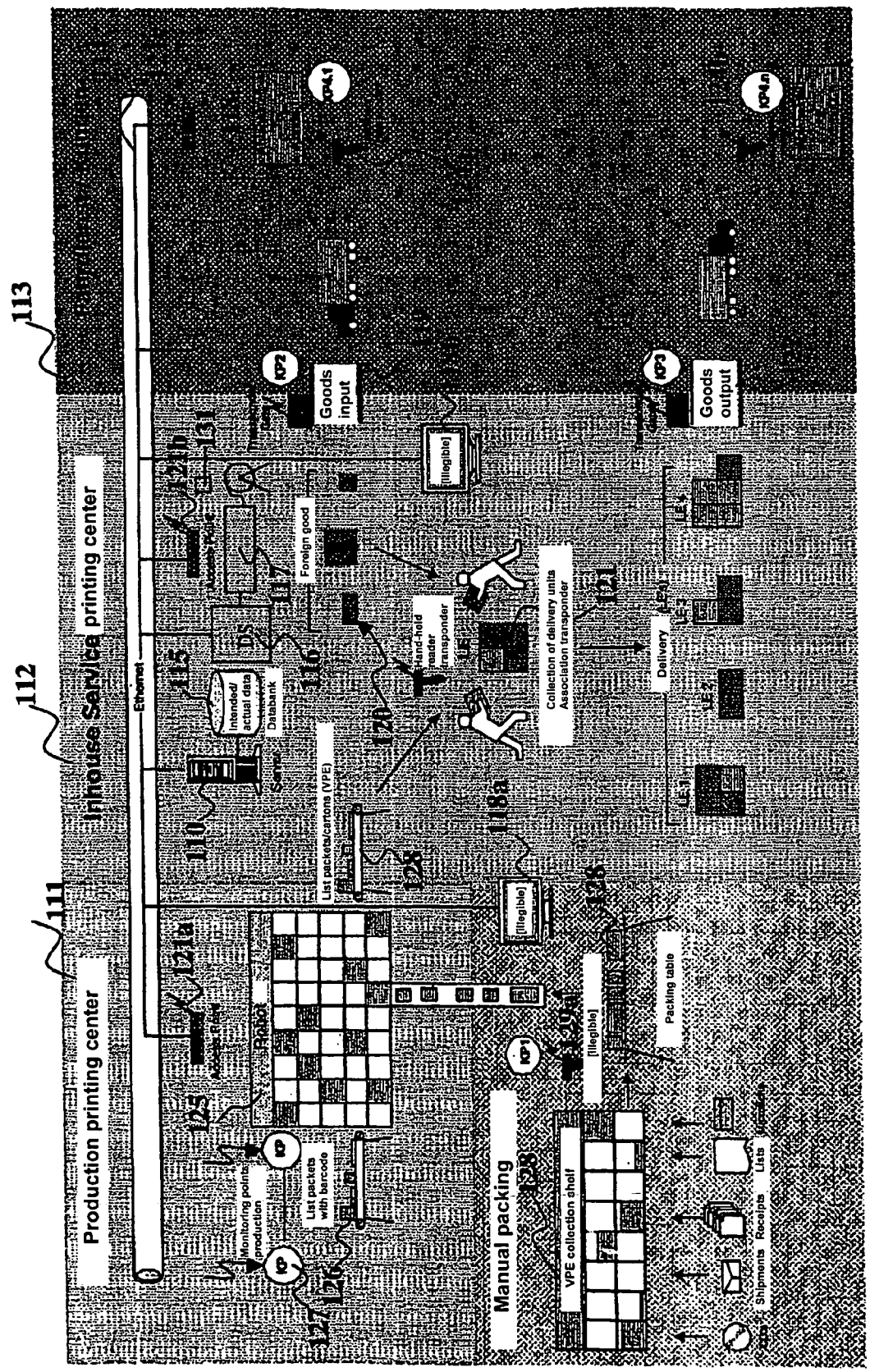
FIG. 10 illustrates a goods logistics system.

In FIG. 10 it is shown how an inventive print production system is used for a goods logistics concept. For this, a production center 111, an in-house service center 112 and a delivery area 113 are connected with one another via a network connection, in particular via a Local Area Network (LAN) and/or via the Internet. A server 110 on which a logistics databank 115 is stored is connected to the network connection 114. The data of the server 110 can be input, recalled and/or changed via terminals 118a, 118b, 118c. For production of delivery notes that contain a transponder, a print server 116 is provided to which a print device 117 is connected. The transponder data (transponder identification number) are thereby (respectively temporally, spatially and/or functionally closely coupled) retrieved from a document (delivery bill) to be printed and connected in the databank 115 with current delivery data such as a delivery number, a delivery subject, a delivery address or the like. Exactly the same are goods that arrive or whose delivery bills are detected with a transponder hand-held reader and transferred without contact to a connection point 121c that is connected to the network connection 114. Foreign goods 120 thus input is optionally unpacked in the in-house service center 112 and supplied to the production center 111 or are supplied for combination of delivery units 121. In this context, a delivery bill equipped with a transponder is printed out on the print device 117 and characteristic data about the delivery contents is simultaneously stored in the databank 115. The delivery units thus assembled (LE1, LE2, LE3, LE4) are provided in the goods output 112 for retrieval. As soon as a delivery unit leaves the goods output, the transponder number from the goods dispatch note/delivery bill is detected at a transponder gate 123 and the delivery, meaning the current delivery status, is stored in the databank 115 where it can be retrieved with all connected terminals. The transponder gate 123 is connected via radio with the network 114 without contact via the connection point 121b. As soon as the delivery arrives at the receiver, the delivery bills are detected with a transponder hand-held reader 124b and imported into the network connection 114 via the connection point 121c, such that the receipt or current whereabouts of the goods is stored in the databank 115.

As an expansion of the shown system, operations of the deployed people can be coupled via a unique identification of the goods in that, for temporal progression of a process, the person can also be identified that responsibly directs the progress at this point in time, in that a transponder is also integrated into the identification for this person and this ID number is stored in the databank.

On the production side, various list packets 126 can be created that respectively comprise a barcode. Furthermore, on the production side monitoring points 127 are provided that detect the barcodes and report (controlled by radio) the data to the databank 115 via the access point 121a. Using the printed barcodes, a robot 125 can combine the list packets into packing units (cartons) 128. Such packing units 128 can likewise be combined via a packing collection rack 120, detected via corresponding hand-held barcode readers 129 and be entered into the databank 115 and supplied to the robot 125. Delivery units 121 that, as in the aforementioned case, are provided with a goods dispatch note which bears a transponder can then in turn be combined from the packing units 128. The barcodes of the packing units are thereby detected and, temporally, spatially and/or functionally coupled with the creation of the goods letter, the barcodes data and the transponder data (identification number) are stored in the databank 115. In addition to packages, compact discs, shipments, documents, lists and microfiche can also be deposited in the packing unit collection rack.

In the exemplary embodiments, both cable-connected network and wireless networks have been described. It is clear that both types of networks are respectively usable at the respective locations.

In the framework of the preferred embodiment, various identification features and associated read/write and/or checking devices and print units are modularly connected. In particular the Transponder-based [sic] identification features can thereby be interactively related (meaning reading and writing with a databank) which, for example in logistic systems, can be advantageously used for updating the location information. Further identification features can, for example, be a magnet coding stripe system (threads) that can contain the print good or a biometric system (fingerprint, iris, genetic) whose data can in particular be stored encrypted in the transponder and/or in the databank. Furthermore, a hologram dispenser can be provided that brings additional security features into the recording medium, or other encodings/encryptions that are contained in the recording medium and that can be processed with corresponding read/write devices. Printing applicable magnetic encodings, for example magnetic ink recognition toner (MICR toner) and corresponding readers can also expand the system. What are known as invisible inks can also be used for encoding the documents and corresponding readers can be used for authentication. The readers are system-compatible with the readers in the procedure process when the goods/documents or identifications for tracking and tracing are read there.

The system and method of the preferred embodiment can in particular be realized as a computer program (software). It can therewith be distributed as a computer program module, as a file on a data medium such as a diskette or CD-ROM, or as a file via a data or communication network. Such and comparable computer program products or computer program elements are defined embodiments The procedure can be used with a computer, in a print device and/or in a printing system with upstream or downstream data processing devices. It is thereby clear that corresponding computers on which the system and method is used can comprise further known technical devices such as input devices (keyboard, mouse, touchscreen), a microprocessor, a data or control bus, a display device (monitor, display) as well as a working storage, a fixed disc storage and a network card.

While preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention both now or in the future are desired to be protected.

The invention claimed is:

1. A method for production of a plurality of printed documents each having a unique identifier by use of a high-speed printer, comprising the steps of:
providing a file with information to be printed on each of the printed documents, said file not having said unique identifier stored therein prior to a printing of said information on each of said documents;
providing a recording medium with the transponder for each document to be printed on the medium, said transponders being capable of being electronically read without contact at said high-speed printer, and one of said unique identifiers being stored in unchangeable fashion in an electronic storage region of each of said transponders;
printing said information for each document from said file onto said recording medium with said high-speed printer to create each of the said printed documents and reading said unique identifier from each of said transponders;
if said unique identifier could not be successfully read from the transponder, storing in a reprint list file an identification of the printed document having the not successfully read transponder;
linking said unique identifiers read from said transponders in said file with each of said document information printed on each of said documents; and
by use of said reprint list file, automatically instituting a reprinting of said document information but associated with a new one of said transponders for each printed document having said not successfully read transponder.

2. A method of claim 1 wherein said reading of said unique identifier occurs after said printing of said information for each document.

3. A method of claim 1 wherein said recording medium comprises a continuous web for said documents to be printed.

4. A method of claim 1 wherein said recording medium comprises cut sheets with one cut sheet for each document to be printed.

5. A method of claim 1 wherein after said reading of said unique identifier from said transponder on each printed document a said high-speed printer, reading said printed information for said printed document to determine whether or not said printed information has been correctly printed, and if not, a reprinting is instituted of said information but associated with a new one of said transponders.

6. A method of claim 5 wherein said reading of said printed document information is with an optical system at said high-speed printer.

7. A method of claim 1 wherein said printed information for each document is read from the printed document and is compared for printing errors by use of the information in said file to be printed for said document, and then a control file is generated based on said comparison.

8. A method claim 7 wherein said control file is used in a later further processing of said document.

9. A method of claim 1 wherein additional information is written onto said transponder at said high-speed printer after said printing.

10. A method of claim 1 including generating said information to be printed on said file by combining data of a layout master document-by-document with a variable contents of a data bank, and linking said information to be printed to an intended list, and with said intended list monitoring said printed documents.

11. A method of claim 1 including linking said file with the information to be printed to an intended list and using said intended list for monitoring correct production of said printed documents.

12. A method of claim 1 including the step of creating a list of the transponders which were read and for each transponder storing information at said list about a result of the reading.

13. A method of claim 1 including the step of providing a post-processing device at said high-speed printer for processing said printed documents.

14. A method of claim 13 wherein said recording medium comprises a web and said post-processing device cuts said web.

15. A system for production of a plurality of printed documents each having a unique identifier, comprising:
  a high-speed printer;
  a file with information to be printed on each of the printed documents by said high-speed printer, said file not having said unique identifier stored therein prior to a printing of said information on each of said documents;
  a recording medium with a transponder for each document to be printed on the medium, said transponders being capable of being electronically read without contact, and one of said unique identifiers being stored in unchangeable fashion in an electronic storage region of each of said transponders;
  said high speed printer printing said information for each document from said file onto said recording medium to create each of said printed documents;
  a read head at said high-speed printer reading said unique identifier from each of said transponders;
  if said unique identifier could not be successfully read from the transponder by said read head, an identification of the printed document having the not successfully read transponder being stored in a reprint list file;
  said unique identifiers read from said transponders at said high-speed printer being linked in said file with each of said document information printed on each of said documents; and
  a reprint control unit for instituting a reprinting of said document information, but associated with a new one of said transponders for each printed document having said not successfully read transponder.

16. A system of claim 15 wherein said unique identifier is read by said read head after said high-speed printer prints said information for each document.

17. A system of claim 15 wherein said recording medium comprises a continuous web for said documents to be printed.

18. A system of claim 15 wherein said recording medium comprises separate cut sheets with one cut sheet for each document to be printed.

19. A system of claim 15 wherein after said reading of said unique identifier from said transponder on each printed document at said high-speed printer, with a reading system reading said printed information for said printed document to determine whether or not said printed information has been correctly printed, and if not, a reprinting is instituted of said information but associated with a new one of said transponders.

20. A system of claim 19 wherein said reading system for reading said printed document information comprises an optical system at said high-speed printer.

21. A system of claim 15 wherein said printed information for each document is read by a reading system at said high-speed printer from the printed document and is compared for printing errors by use of the information in said file to be printed for said document, and then a control file is generated based on said comparison.

22. A system claim 21 wherein said control file is used in a later further processing of said document.

23. A system of claim 15 wherein additional information is written onto said transponder with a write head at said high-speed printer after said printing.

24. A system of claim 15 including said information to be printed is generated on said file by combining data of a layout master document-by-document with a variable contents of a data bank, and said information to be printed is linked to an intended list, and with said intended list said printed documents are monitored.

25. A system of claim 15 including an intended list being linked to said file with the information to be printed and a monitoring unit which uses said intended list for monitoring correct production of said printed documents.

26. A system of claim 15 including a list of the transponders which were read and for each transponder information being stored at said list about a result of the reading.

27. A system of claim 15 including a post-processing device at said high-speed printer for processing said printed documents.

28. A system of claim 27 wherein said recording medium comprises a web and said post-processing device cuts said web.

* * * * *